(12) United States Patent
Sharifi et al.

(10) Patent No.: US 9,703,541 B2
(45) Date of Patent: Jul. 11, 2017

(54) ENTITY ACTION SUGGESTION ON A MOBILE DEVICE

(71) Applicant: GOOGLE INC., Mountain View, CA (US)

(72) Inventors: Matthew Dominic Sharifi, Kilchberg (CH); David Petrou, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/724,965

(22) Filed: May 29, 2015

(65) Prior Publication Data

US 2016/0321052 A1 Nov. 3, 2016

Related U.S. Application Data

(60) Provisional application No. 62/153,756, filed on Apr. 28, 2015.

(51) Int. Cl.
*G06F 9/445* (2006.01)
*G06F 17/30* (2006.01)
(Continued)

(52) U.S. Cl.
CPC .......... *G06F 8/61* (2013.01); *G06F 17/30867* (2013.01); *H04L 67/10* (2013.01); *H04M 1/72525* (2013.01)

(58) Field of Classification Search
None
See application file for complete search history.

(56) References Cited

U.S. PATENT DOCUMENTS 5,946,647 A    8/1999   Miller et al.
6,662,226 B1   12/2003   Wang et al.
(Continued)

FOREIGN PATENT DOCUMENTS

CN    101075236 A    11/2007
CN    101201827 A     6/2008
(Continued)

OTHER PUBLICATIONS

U.S. Appl. No. 14/465,265, filed Aug. 21, 2014, 46 pages.
(Continued)

*Primary Examiner* — Qamrun Nahar
(74) *Attorney, Agent, or Firm* — Brakes Hughes Bellermann LLP

(57) ABSTRACT

Systems and methods are provided for suggesting actions for entities discovered in content on a mobile device. An example method can include running a mobile device emulator with a deep-link for a mobile application, determining a main entity for the deep link, mapping the main entity to the deep link, storing the mapping of the main entity to the deep link in a memory, and providing the mapping to a mobile device, the mapping enabling a user of the mobile device to select the deep link when the main entity is displayed on a screen of the mobile device. Another example method can include identifying at least one entity in content generated by a mobile application, identifying an action mapped to the at least one entity, the action representing a deep link into a second mobile application, and providing a control to initiate the action for the entity.

22 Claims, 8 Drawing Sheets

(51) Int. Cl.
*H04L 29/08* (2006.01)
*H04M 1/725* (2006.01)

(56) References Cited

U.S. PATENT DOCUMENTS

| | | | |
|---|---|---|---|
| 7,054,917 | B1 | 5/2006 | Kirsch et al. |
| 7,421,153 | B1 | 9/2008 | Ronca et al. |
| 7,548,915 | B2 | 6/2009 | Ramer et al. |
| 7,822,759 | B2 | 10/2010 | MacLaurin et al. |
| 7,917,514 | B2 | 3/2011 | Lawler et al. |
| 8,150,911 | B2 | 4/2012 | Bell et al. |
| 8,204,966 | B1 | 6/2012 | Mendis et al. |
| 8,255,386 | B1 | 8/2012 | Annau et al. |
| 8,280,414 | B1 | 10/2012 | Nourse et al. |
| 8,347,237 | B2 | 1/2013 | Bier et al. |
| 8,452,799 | B2 | 5/2013 | Zhou et al. |
| 8,468,110 | B1 | 6/2013 | Podgomy et al. |
| 8,571,319 | B2 | 10/2013 | Balasubramanian et al. |
| 8,645,325 | B2 | 2/2014 | Anderson et al. |
| 8,700,604 | B2 | 4/2014 | Roseman et al. |
| 8,767,497 | B2 | 7/2014 | Marumoto et al. |
| 8,954,836 | B1* | 2/2015 | Look ............... G06F 17/30867 715/205 |
| 8,977,639 | B2 | 3/2015 | Petrou et al. |
| 9,165,406 | B1 | 10/2015 | Gray et al. |
| 9,582,482 | B1 | 2/2017 | Sharifi et al. |
| 2004/0117750 | A1 | 6/2004 | Skoll et al. |
| 2005/0083413 | A1 | 4/2005 | Reed et al. |
| 2006/0047639 | A1 | 3/2006 | King et al. |
| 2006/0080594 | A1 | 4/2006 | Chavoustie et al. |
| 2006/0106844 | A1 | 5/2006 | Naick et al. |
| 2006/0156222 | A1 | 7/2006 | Chi et al. |
| 2006/0221409 | A1 | 10/2006 | Cohen et al. |
| 2006/0253491 | A1 | 11/2006 | Gokturk et al. |
| 2007/0008321 | A1 | 1/2007 | Gallagher et al. |
| 2007/0047781 | A1 | 3/2007 | Hull et al. |
| 2007/0143345 | A1 | 6/2007 | Jones et al. |
| 2007/0168379 | A1 | 7/2007 | Patel et al. |
| 2008/0176606 | A1 | 7/2008 | Kim |
| 2008/0235018 | A1 | 9/2008 | Eggen et al. |
| 2008/0275701 | A1 | 11/2008 | Wu et al. |
| 2008/0281974 | A1 | 11/2008 | Slothouber et al. |
| 2008/0301101 | A1 | 12/2008 | Baratto et al. |
| 2009/0006388 | A1 | 1/2009 | Ives et al. |
| 2009/0063431 | A1 | 3/2009 | Erol et al. |
| 2009/0228573 | A1 | 9/2009 | Asakawa et al. |
| 2009/0282012 | A1 | 11/2009 | Konig et al. |
| 2009/0319449 | A1 | 12/2009 | Gamon et al. |
| 2010/0060655 | A1 | 3/2010 | Huang |
| 2010/0088612 | A1 | 4/2010 | Jia et al. |
| 2010/0250598 | A1 | 9/2010 | Brauer et al. |
| 2010/0262928 | A1 | 10/2010 | Abbott |
| 2011/0072455 | A1 | 3/2011 | Pickelsimer et al. |
| 2011/0125735 | A1 | 5/2011 | Petrou |
| 2011/0128288 | A1 | 6/2011 | Petrou et al. |
| 2011/0131160 | A1 | 6/2011 | Canny et al. |
| 2011/0131235 | A1 | 6/2011 | Petrou et al. |
| 2011/0145692 | A1 | 6/2011 | Noyes et al. |
| 2011/0238768 | A1 | 9/2011 | Habets et al. |
| 2011/0246471 | A1 | 10/2011 | Rakib |
| 2011/0275358 | A1 | 11/2011 | Faenger |
| 2011/0283296 | A1 | 11/2011 | Chun |
| 2011/0307478 | A1 | 12/2011 | Pinckney et al. |
| 2011/0307483 | A1 | 12/2011 | Radlinski et al. |
| 2012/0044137 | A1 | 2/2012 | Oddiraju et al. |
| 2012/0083294 | A1 | 4/2012 | Bray et al. |
| 2012/0117058 | A1 | 5/2012 | Rubinstein et al. |
| 2012/0158751 | A1 | 6/2012 | Tseng |
| 2012/0191840 | A1 | 7/2012 | Gordon |
| 2012/0194519 | A1 | 8/2012 | Bissell et al. |
| 2012/0216102 | A1 | 8/2012 | Malla |
| 2013/0080447 | A1 | 3/2013 | Ramer et al. |
| 2013/0091463 | A1 | 4/2013 | Nordstrom et al. |
| 2013/0097507 | A1 | 4/2013 | Prewett |
| 2013/0108161 | A1 | 5/2013 | Carr |
| 2013/0111328 | A1 | 5/2013 | Khanna et al. |
| 2013/0117252 | A1 | 5/2013 | Samaddar et al. |
| 2013/0173604 | A1 | 7/2013 | Li et al. |
| 2013/0254217 | A1 | 9/2013 | Xu |
| 2013/0263098 | A1* | 10/2013 | Duda ............... G06F 11/3664 717/134 |
| 2013/0290110 | A1 | 10/2013 | Luvogt et al. |
| 2013/0325844 | A1 | 12/2013 | Plaisant |
| 2013/0346431 | A1 | 12/2013 | Erol et al. |
| 2014/0029810 | A1 | 1/2014 | Barr et al. |
| 2014/0040272 | A1 | 2/2014 | Houghton |
| 2014/0118597 | A1 | 5/2014 | Tabak et al. |
| 2014/0142922 | A1 | 5/2014 | Liang et al. |
| 2014/0146200 | A1 | 5/2014 | Scott et al. |
| 2014/0152655 | A1 | 6/2014 | Johnston et al. |
| 2014/0157210 | A1 | 6/2014 | Katz et al. |
| 2014/0188889 | A1 | 7/2014 | Martens et al. |
| 2014/0250147 | A1 | 9/2014 | Shapira et al. |
| 2014/0279013 | A1 | 9/2014 | Chelly et al. |
| 2014/0282660 | A1 | 9/2014 | Oztaskent et al. |
| 2014/0316890 | A1 | 10/2014 | Kagan |
| 2014/0366158 | A1 | 12/2014 | Han et al. |
| 2015/0016700 | A1 | 1/2015 | Drozdzal et al. |
| 2015/0019997 | A1 | 1/2015 | Kim et al. |
| 2015/0095855 | A1 | 4/2015 | Bai et al. |
| 2015/0100524 | A1 | 4/2015 | Pantel et al. |
| 2015/0169701 | A1 | 6/2015 | Stekkelpak et al. |
| 2015/0178786 | A1 | 6/2015 | Claessens |
| 2015/0212695 | A1 | 7/2015 | Nordstrom et al. |
| 2016/0055246 | A1 | 2/2016 | Marcin et al. |

FOREIGN PATENT DOCUMENTS

| | | |
|---|---|---|
| CN | 101587495 A | 11/2009 |
| CN | 101763357 A | 6/2010 |
| EP | 2306290 A2 | 4/2011 |
| EP | 2466921 A2 | 6/2012 |
| EP | 2728481 A1 | 5/2014 |
| EP | 2824558 A1 | 1/2015 |
| WO | 03088080 A1 | 10/2003 |
| WO | 2009054619 A2 | 4/2009 |
| WO | 2012075315 A1 | 6/2012 |
| WO | 2013173940 A1 | 11/2013 |
| WO | 2014/105922 A1 | 7/2014 |
| WO | 2014146265 A1 | 9/2014 |

OTHER PUBLICATIONS

U.S. Appl. No. 14/451,385, filed Aug. 4, 2014, 109 pages.
U.S. Appl. No. 14/872,582, filed Oct. 1, 2015, 43 pages.
U.S. Appl. No. 14/945,348, filed Nov. 18, 2015, 47 pages.
Adistambha et al., "Efficient Multimedia Query-by-Content from Mobile Devices", Computers & Electrical Engineering, vol. 36, Issue 4, Jul. 2010, pp. 626-642.
Hsu et al., "Snap2Read: Automatic Magazine Capturing and Analysis for Adaptive Mobile Reading," Proceedings of the 17th International Conference on Advances in Multimedia Modeling—vol. Part II, Jan. 5, 2011, 11 pages.
International Search Report and Written Opinion for PCT Application No. PCT/US2016/027875, mailed Jun. 20, 2016, 13 pages.
International Search Report and Written Opinion for PCT Application No. PCT/US2016/055055, mailed on Dec. 5, 2016, 12 pages.
Collobert, et al., "Natural Language Processing (almost) from Scratch", Journal of Machine Learning Research, vol. 12, Aug. 1, 2011, pp. 2493-2537.
Minkov, et al., "Extracting Personal Names from Email: Applying Named Entity Recognition to Informal Text", Proceedings of Human Language Technology Conference and Conference on Empirical Methods in Natural Language Processing, retrieved from https://www.cs.cmu.eduk/~rcwang/papers/emnlp-2005.pdf, Oct. 1, 2005, pp. 443-450.
Final Office Action for U.S. Appl. No. 14/451,385, mailed on Nov. 18, 2016, 18 pages.
Final Office Action for U.S. Appl. No. 14/451,393, mailed Oct. 21, 2016, 31 pages.

(56) References Cited

OTHER PUBLICATIONS

Non Final Office Action for U.S. Appl. No. 14/465,265, mailed Oct. 6, 2016, 19 Pages.
U.S. Appl. No. 14/451,389.
U.S. Appl. No. 14/451,390.
U.S. Appl. No. 14/451,393.
U.S. Appl. No. 14/712,679.
U.S. Appl. No. 14/451,401.
U.S. Appl. No. 14/465,279.
U.S. Appl. No. 14/451,396.
U.S. Appl. No. 14/451,385.
U.S. Appl. No. 14/872,582.
U.S. Appl. No. 14/945,348.
U.S. Appl. No. 14/465,265.
International Search Report and Written Opinion for PCT Patent Application No. PCT/US2016/062475, mailed on Mar. 9, 2017, 15 pages.

\* cited by examiner

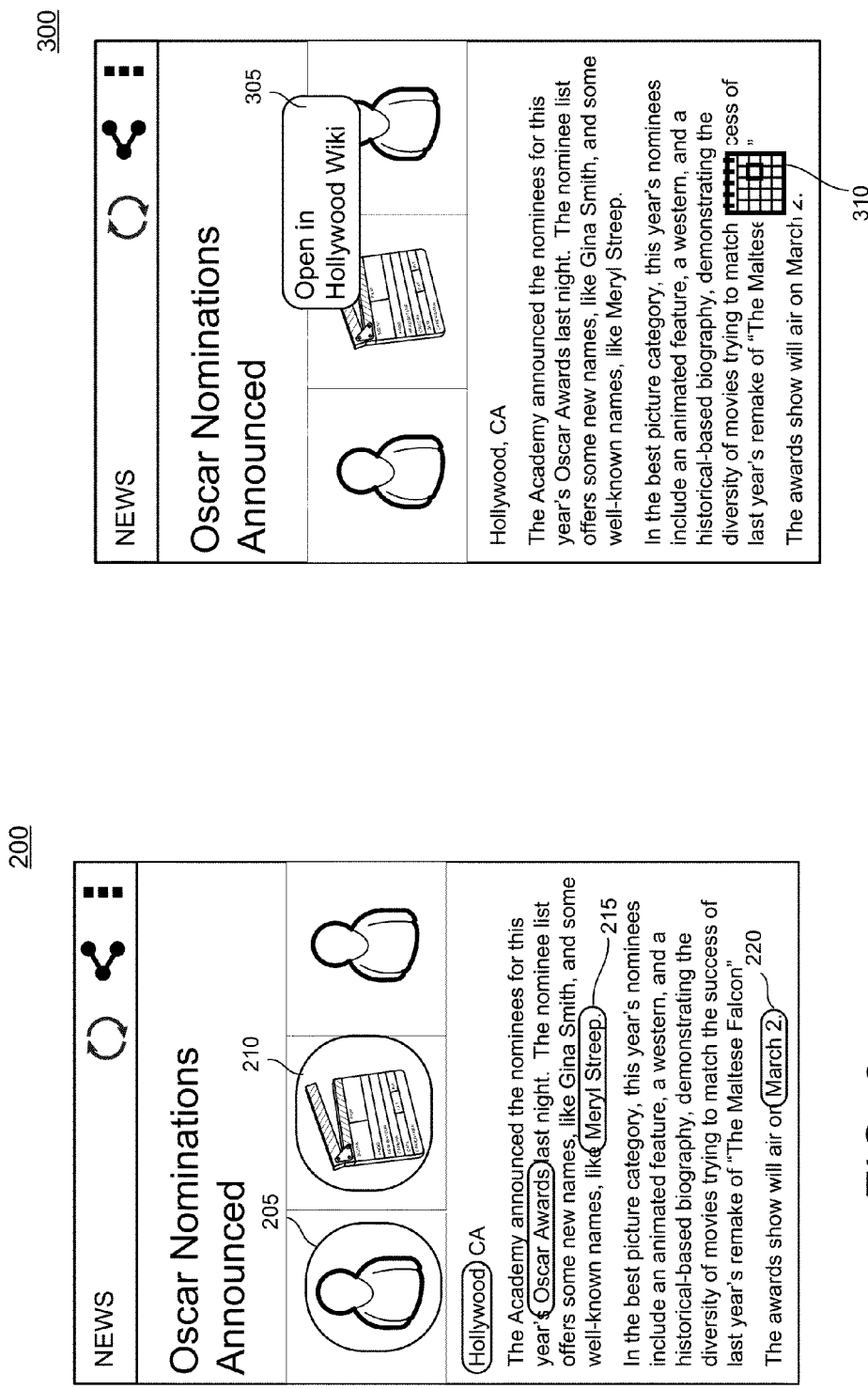

| Entity Id /<br>Entity Type Id | Deep Link | Description | Secondary<br>Link | Secondary<br>Description | Topicality<br>Score |

ENTITY ACTION SUGGESTION ON A MOBILE DEVICE

RELATED APPLICATION

This application is a non-provisional of, and claims priority to, U.S. Provisional Application No. 62/153,756, filed Apr. 28, 2015, entitled "Entity Action Suggestion on a Mobile Device." The subject matter of this earlier filed application is incorporated herein by reference.

BACKGROUND

Due to the use of mobile devices, such as smartphones and tablets, user interaction with mobile applications has been increasing. As users move away from web-based browsers to using mobile devices they often lose the ability to easily transfer data from one mobile app to another. In general, mobile applications are single purpose and very good at one specific thing, but moving information between mobile applications can be cumbersome and a user may not know which app is good for a given purpose, or even when to look for an app to help them out.

SUMMARY

Implementations perform entity detection in a mobile app environment and provide suggested actions for one or more detected entities. For example, implementations may detect entities in on-screen content and propose one or more actions for some of the detected entities. The actions are deep links into destination mobile applications. Thus, the suggested action, which is selected in a first mobile application, allows a user to seamlessly and quickly perform the action in a destination (e.g., second differing) application. The user need not have the destination mobile application installed on the device as some implementations may suggest a destination mobile application to the user for performing the action. Thus, the system is able to propose a popular mobile application used with a particular entity, in effect telling the user about a helpful mobile application when appropriate. The action (deep link) may be associated with a destination mobile application in a mapping table. The entries in the table may be provided by a developer of the mobile application, by an emulator that discovers the deep link, or by actions taken by a user of the mobile device.

In one general aspect, a mobile device includes at least one processor and memory storing instructions that, when executed by the at least one processor, cause the mobile device to perform operations. The operations include identifying, in response to a user request, at least one entity in content generated by a mobile application, identifying an action mapped to the at least one entity, the action representing a deep link into a second mobile application, and providing a control that allows the user to initiate the action for the entity.

In one general aspect, a method includes running a mobile device emulator with a deep-link for a mobile application, determining a main entity for the deep link, mapping the main entity to the deep link, storing the mapping of the main entity to the deep link in a memory, and providing the mapping to a mobile device, the mapping enabling a user of the mobile device to select the deep link when the main entity is displayed on a screen of the mobile device.

In one general aspect, a method includes identifying, in response to a user gesture on a mobile device, at least one entity in content generated by a mobile application, identifying an action mapped to the at least one entity, the action representing a deep link into a second mobile application, and providing a control that allows the user to initiate the action for the entity.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for detection and ranking of entities from mobile screen content and providing actions for some detected entities, substantially as shown in and/or described in connection with at least one of the figures, and as set forth more completely in the claims.

One or more of the implementations of the subject matter described herein can be implemented so as to realize one or more of the following advantages. As one example, implementations may provide a consistent user experience across mobile applications, so that similar types of actions are suggested for an entity across mobile applications. As another example, implementations may improve the user experience by suggesting applications that can help the user find/handle information more quickly to the user, even though the user may not have knowledge of the application. As another example, implementations improve the user experience by helping the user perform tasks more quickly, e.g. with fewer gestures from the user. In some implementations, the actions suggested may be customized for the user of the mobile device, making it more likely that the user finds the suggested actions helpful. Implementations can also provide action suggestions that are known to be helpful for other users. Thus, implementations may also allow a mobile device to automatically perform a task with minimal input from the user.

The details of one or more implementations are set forth in the accompanying drawings and the description below. Other features will be apparent from the description and drawings, and from the claims.

BRIEF DESCRIPTION OF DRAWINGS

FIG. 2 is an example display of a mobile computing device.

FIG. 3 is an example display of a mobile computing device with suggested action controls.

Like reference symbols in the various drawings indicate like elements.

DETAILED DESCRIPTION

Implementations include systems and methods that identify deep links for various mobile applications and associate the deep link with at least one entity. The entity may be identified in a knowledge base or may match an entity template. Implementations may also identify entities in the onscreen content of a mobile device and provide a deep link for at least one of the entities. The system may generate a suggested action control to provide a way for the user to perform the action represented by the deep link. Thus, when a user selects the control the system may initiate the action. The system operates across all applications used on a mobile device, making the user experience consistent. The action suggestion is thus not limited to particular mobile applications. Moreover, the suggested actions may be for mobile applications that the user has not yet installed and, thus, can serve as a way to inform the user about useful mobile applications.

Figure 1:
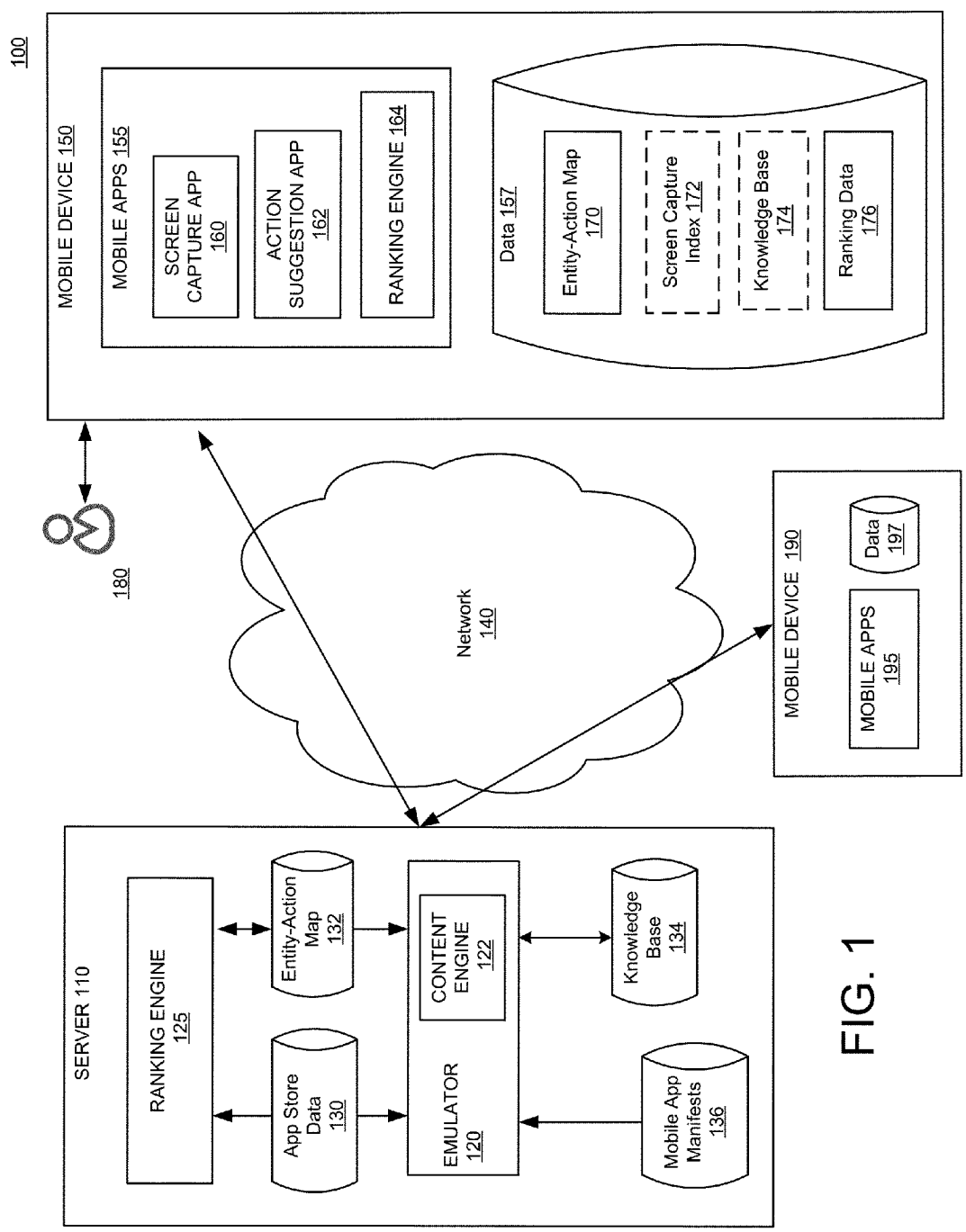
FIG. 1 is a block diagram illustrating an example system in accordance with the disclosed subject matter.

FIG. 1 is a block diagram of a mobile action suggestion system in accordance with an example implementation. The system 100 may be used to provide actions in the form of deep links for entities recognized in on-screen content of a mobile device. The actions may include deep links for mobile applications the user has not yet installed on the mobile device. The mobile application that is represented by the deep link is also referred to as the destination application. The action suggestions may be based on previous actions performed by/selected by the user. The depiction of system 100 in FIG. 1 is a client-server system, with some data processing occurring at a server 110. However, other configurations and applications may be used. For example, the data processing may occur exclusively on the mobile device 150. In some implementations, a user of the mobile device 150 may indicate that portions of the processing be performed at the server 110. Thus, implementations are not limited to the exact configurations illustrated.

The mobile action suggestion system 100 may include a knowledge base 134. The knowledge base 134 may be a large graph-based data store that stores data and rules that describe knowledge about the data in a form that provides for deductive reasoning. For example, in a knowledge base, information may be stored about entities in the form of relationships to other entities. An entity may be may be a person, place, item, idea, topic, word, phrase, abstract concept, concrete element, other suitable thing, or any combination of these. Entities may be related to each other by labeled edges that represent relationships. The labeled edges may be directed or undirected. For example, the entity representing the National Football League may be related to a Jaguar entity by a "has team" relationship. A knowledge base with a large number of entities and even a limited number of relationships may have billions of connections. In some implementations, knowledge base 134 may be stored in an external storage device accessible from server 110 and/or mobile device 150. In some implementations, the knowledge base 134 may be distributed across multiple storage devices and/or multiple computing devices, for example multiple servers. The entities and relationships in the knowledge base 134 may be searchable, e.g., via an index. For example, the index may include text by which an entity has been referred to. Thus, reference to the knowledge base 134 may be understood to include an index that facilitates finding an entity using a text equivalent.

Figure 9:
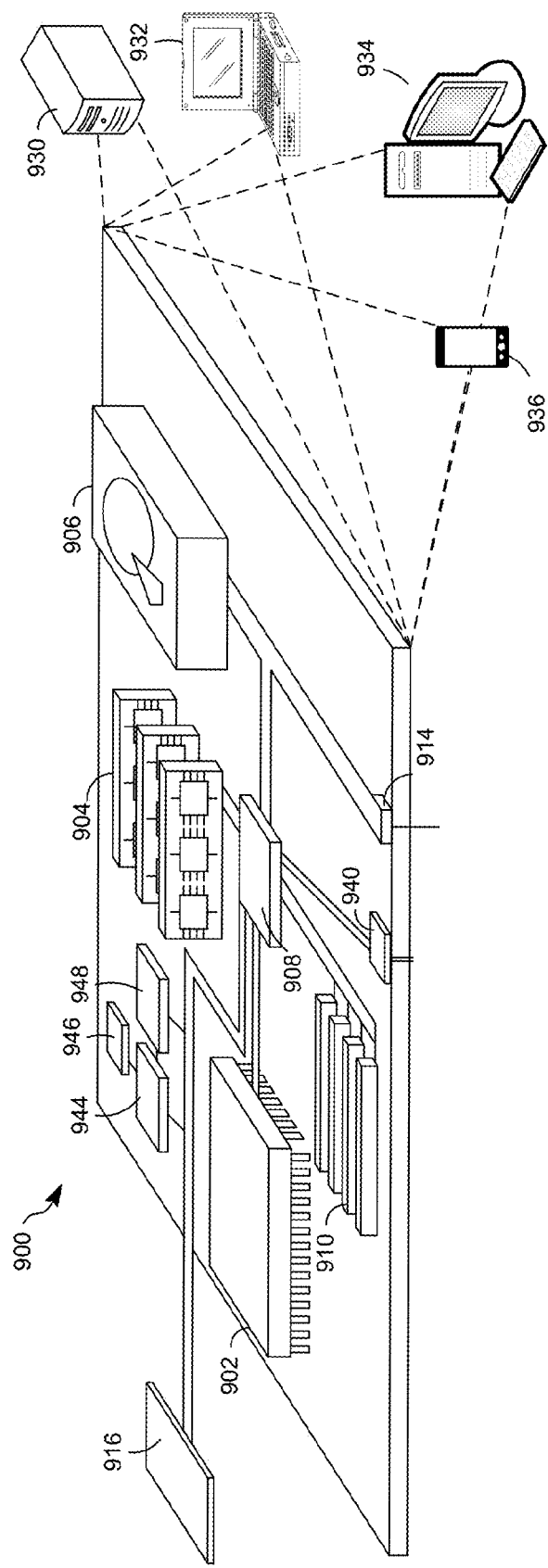
FIG. 9 shows an example of a computer device that can be used to implement the described techniques.
Figure 10:
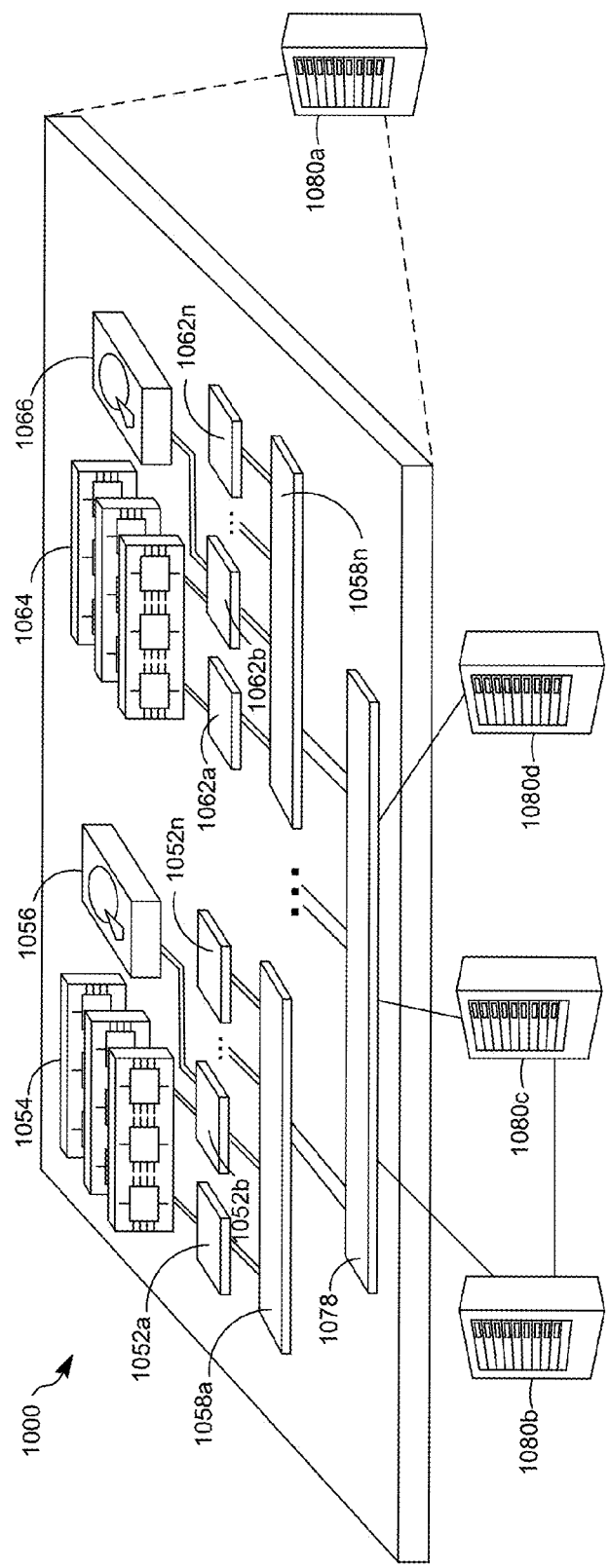
FIG. 10 shows an example of a distributed computer device that can be used to implement the described techniques.

The mobile action suggestion system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 900, as depicted in FIG. 9, or computer device 1000, as depicted in FIG. 10. Server 110 may include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 110.

The mobile action suggestion system 100 may include an emulator 120. The emulator 120 may emulate a mobile device in a batch environment. In other words, the emulator 120 may be configured to execute a mobile application and determine screen content generated by the mobile application. In some implementations, the emulator 120 may be provided with a set of deep links from a developer of the mobile application, for example as part of mobile application manifests 136. Such manifests 136 conventionally include information about an application, such as the developer, an icon, a description, a version, etc. Some of this information may be used to help users decide whether to install the application. Some of the information may be intended for other application developers, such as application programming interfaces (APIs) or deep links. The deep links in a mobile application manifest 136 may be similar to parameters that, when provided to the mobile application, cause the mobile application to display particular content. In some implementations, the deep link may be an identifier that encodes the application identifier and data used to start the application in a particular state. In some implementations, the deep links may be a list of variable-value pairs (e.g., XML elements) that, when provided to the mobile application, cause the mobile application to display the particular content. In some implementations, the deep link can be a single variable-value pair (e.g., XML element) with a regular expression. Such a deep link may be referred to as a deep link template. In some implementations, the deep link template may also specify or be associated with an entity type. The emulator 120 may be configured to determine deep links for the mobile application using the template and entity type (if applicable).

The emulator 120 may be configured to provide a deep link to the mobile application and determine content generated in response to the deep link. In some implementations, the content may be information in a frame buffer. In some implementations, the content may be information used by the operating system to generate a frame buffer. In some implementations, where the deep link in the mobile application manifest 136 is a deep link template, the emulator 120 may be configured to iterate over values matching the regular expression to determine which values result in valid content (as opposed to an error or "not found" screen). In this sense, the emulator 120 is able to crawl deep link templates to determine which deep links are valid. In some implementations, the deep link may correspond to a search user interface. In such implementations, the emulator 120 may be configured to crawl the search interface to determine which entity types result in valid content. Once the emulator 120 discovers a valid entity type for the search interface, the emulator 120 may be configured to try each entity of that type that exists in the knowledge base 134. For example, the emulator 120 may be configured to use a name of the entity in the search user interface and determine whether the application returns valid content. In some implementations, the emulator 120 may determine that the search interface responds to an entity matching a particular entity template. For example, a taxi requesting application may accept an address as a search input. The emulator 120 may be configured to try a street address in the search input to determine what content is generated. In some implementations, the application manifest 136 may indicate a deep link to a search interface and specify the entity template type as valid input for the search interface. In some implementations, the emulator 120 may crawl a list of deep links provided to the emulator. The list of deep links may be provided by the application (e.g., in the manifest).

The emulator 120 may also include a content engine 122. The content engine 122 may include components that analyze the screen content generated by the emulator 120 (e.g., as a result of providing a deep link/search request to the mobile application) and to identify entities in the screen content. The identified entities may be entities that are also in the knowledge base 134. Accordingly, when the content is from a frame buffer, the content engine 122 can be configured to perform various types of recognition, such as character recognition, image recognition, logo recognition, etc., using conventional or later developed techniques. The content engine 122 may match the items identified (e.g., text, images, logos) to entities in the knowledge base 134. The identified entities may also include text that fits a particular template, such as phone numbers, email addresses, or street addresses. The process of identifying entities in the content generated by a mobile application is referred to as entity detection. The emulator 120 may include any known or later method of entity detection.

Figures 7, 8:
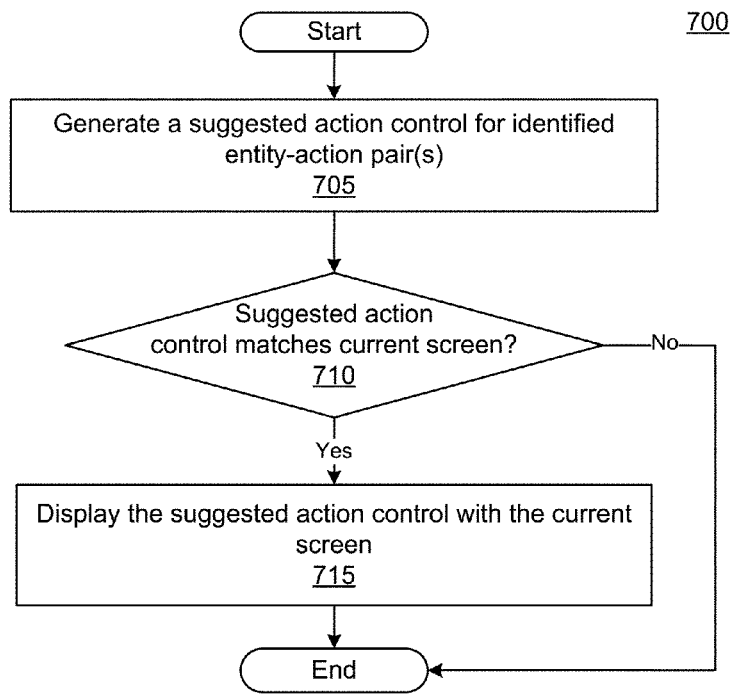
FIG. 7 illustrates a flow diagram of an example process for displaying suggested action controls on a mobile computing device, in accordance with disclosed implementations.
FIG. 8 illustrates an example entity-action map structure, in accordance with disclosed implementations.

The content engine 122 may also be configured to calculate a topicality score for entities identified in screen content. The topicality rank represents how important the entity is to the screen content. An entity used to generate the content (e.g., in the search input or satisfying the regular expression) may receive a high rank. As another example, an entity that occurs in a title or several times in the screen may receive a high topicality score. Likewise, an entity that is the only entity identified in the content may have a high topicality score. Entities of equal importance that appear in the content may receive equal topicality scores. The emulator 120 may then be configured to map any entity (or entities) to the deep link that represents the content. The emulator 120 may store the mapping in entity-action map 132. The entity-action map 132 may map an identifier for the entity from the knowledge base 134 with the deep link used to generate the screen content in which the entity was found. For entities that fit a particular entity template (such as phone numbers, street addresses, and email addresses), the entity-action map 132 may map the type of entity to an action. The entity-action map 132 may also include the topicality score for the entity for the deep link. In addition, the entity-action map may include a description. The description may be hand-curated (e.g., after ranking), or may be generated automatically, for example using the name of the mobile application in the application manifest 136. In some implementations, the entity-action map may include a secondary action and a secondary description. The secondary action may be a deep link that takes the user to an application store to select the mobile application for installation. The secondary description may describe this action, for example "install Taxi App". The secondary action and description may be displayed to a user using a mobile device if the user does not have the mobile application installed on the mobile device. FIG. 8 illustrates data elements found in an entity-action map entry 800, according to some implementations.

The system 100 may also include ranking engine 125. The ranking engine 125 may rank the actions mapped from one entity in the entity-action map 132. For example, an entity (e.g., identified by a unique entity identifier from the knowledge base 134 or an entity type that corresponds to a particular format) may be mapped by the emulator 120 to ten different actions (i.e., deep links). The ranking engine 125 may use one or more signals to determine which of the actions are most relevant for the entity. The ranking signals may include static signals. One of the static ranking signals may be to topicality score for the entity. Other static ranking signals may be obtained from application store data 130. The application store is a repository where mobile application developers put their mobile applications for download. The application store may keep metadata about each mobile application in application store data 130. The data may include the number of downloads of a mobile application, the ratings given an application by users who have downloaded the application, etc. Another static ranking signal may be mentions of the mobile application and the entity name in documents, such as web pages. Another static ranking signal may include web-based ranking signals for a web-page equivalent of a mobile application. For example, many mobile applications have a web-page counterpart or web mirror. For example, a restaurant ranking web site may also have a corresponding mobile application. The ranking engine 125 may use the signals used to rank the web site to also rank deep links for the corresponding mobile application. In some implementations, the ranking engine 125 may use such static ranking signals to discard all but the top actions (deep links) for an entity to keep the size of the entity-action map 132 manageable. In some implementations, the ranking engine 125 keeps the top four actions per entity.

The mobile action suggestion system 100 may also include mobile device 150. Mobile device 150 may be any mobile personal computing device, such as a smartphone or other handheld computing device, a tablet, a wearable computing device, etc., that operates in a closed mobile environment rather than a conventional open web-based environment. Mobile device 150 may be an example of computer device 900, as depicted in FIG. 9. Mobile device 150 may be one mobile device used by user 180. User 180 may also have other mobile devices, such as mobile device 190. Mobile device 150 may include one or more processors formed in a substrate configured to execute one or more machine executable instructions or pieces of software, firmware, or a combination thereof. The mobile device 150 may thus include one or more computer memories configured to store one or more pieces of data, either temporarily, permanently, semi-permanently, or a combination thereof. The mobile device 150 may thus include mobile applications 155, which represent machine executable instructions in the form of software, firmware, or a combination thereof. The components identified in the mobile applications 155 may be part of the operating system or may be applications developed for a mobile processing environment. Conventionally, mobile applications operate in a closed environment, meaning that the user employs separate applications to perform activities conventionally performed in a web-based browser environment. For example, rather than going to bookit.com to book a hotel, a user of the mobile device 150 can use a mobile application in mobile applications 155 provided by bookit.com. The web pages may mirror the mobile application, e.g., providing the same or similar content as the mobile application. Thus, in some implementations, the web page(s) (e.g., at bookit.com) may be considered a web mirror of the mobile application (provided by bookit.com).

The mobile applications 155 may include a screen capture application 160, an action suggestion application 162, and a ranking engine 164. In some implementations, one or more of these applications can be provided by the operating system of the mobile device 150. In some implementations, one or more of these applications can be downloaded and installed by the user.

The screen capture application 160 can include various functionalities. In some implementations, the screen capture application 160 may be configured to get textual information represented on the screen from an application program interface (API). In some implementations, the screen capture application 160 may be built into the operating system, which can determine the content of text fields displayed on the current screen. In some implementations, the screen capture application 160 may be configured to capture the current screen of the mobile device 150. The screen capture application 160 may capture the screen by copying or reading the contents of the device's frame buffer. The captured screen may, thus, be an image and is referred to as a captured image. The screen capture application 160 may capture the screen at intervals. The interval can be small, for example every half second or every second. In some implementations, the screen capture application 160 may be configured to capture the screen every time a touch event occurs (e.g., every time the user touches the screen to scroll, zoom, click a link etc.), in response to an explicit user request or command, or when the device transitions from one mobile application to another mobile application. In some implementations, the screen capture application 160 may increase the interval at which a screen capture occurs when the screen does not change. In other words, when the screen is static, the screen capture application 160 may capture images less often. The screen capture application 160 may provide the captured screen images and metadata to a recognition engine, which may be on the mobile device 150 or a server, such as server 110. The metadata may include the timestamp, the mobile device type, a mobile device identifier, the mobile application running when the screen was captured, e.g., the application that generated the screen, etc. In some implementations, the metadata may also include which applications are active, the location of the device, ambient light, motion of the device, etc. The system may use this additional device information to assist in content analysis (e.g., entity disambiguation), suggested action generation (e.g., reducing the quantity of suggestions when the device is moving, deciding what content is most relevant), etc.

In some implementations, the screen capture application 160 can include an indexing engine configured to index a screen capture image according to the text, entities, images, logos, etc. identified in the image. Thus, for example, the indexing engine may generate index entries for a captured image. In some implementations the indexing engine may be on a server, such as server 110, and the screen capture application 160 may provide the captured image and/or recognized items in the captured image to the server. The index may be an inverted index, where a key value (e.g., word, phrase, entity, image, logo, etc.) is associated with a list of images that include the key value. The index may include metadata (e.g., where on the captured image the key value occurs, a rank for the key value for the image, etc.) associated with each captured image in the list. In some implementations, the index may also include a list of captured images indexed by a timestamp. The indexing engine may store the index in memory, for example in screen capture index 172. Of course, in some implementations the system may store the index in a user account on a server in addition to or instead of on the mobile device 150. The user of the mobile device 150 may control when the screen capture application 160 is active. For example, the user may specify that the screen capture application 160 is active only when other specified mobile applications 155 are running (e.g., only when in a social media mobile application). The user may also manually turn the screen capture application 160 on and off, for example via a settings application. In some implementations, the user may invoke the screen capture application 160 with a gesture or action that also invokes the action suggestion application 162.

The mobile device 150 may also include an action suggestion application 162. The action suggestion application 162 may be configured to use an entity-action map, such as entity-action map 170 or entity-action map 132, to determine whether any entities identified in the captured image are associated with an action. In some implementations, the user 180 may specifically invoke or initiate the action suggestion application 162. For example, the user 180 may use an action or gesture, such as swipe up, a long press, a two finger click, or selection from a menu (e.g., a menu that appears after a swipe up or swipe down) to initiate the action suggestion application 162. In some implementations, the gesture may also invoke the screen capture application 160. In some implementations, the gesture/action may also serve to select a particular entity displayed on the screen. For example, if the user 180 performs a long press on an image or word that is determined to correspond with an entity in the knowledge base or that matches an entity type template, the system may interpret the gesture as a request to provide actions for that entity (or type of entity).

The action suggestion application 162 may use an entity-action map, such as entity-action map 170 or entity-action map 132 to determine if any of the identified entities or entity templates includes a matching action. In some implementations, the entity-action map 170 may be a copy of the entity-action map 132. In some implementations, the entity-action map 170 may be subset of the entries in the entity-action map 132. For example, the system may push entries from the entity-action map 132 that are most relevant to a user 180 of the mobile device 150. Relevancy may be determined, for example, using the entities in the screen capture index 172 or some other data store that provides context for user interests.

The entity-action maps associate a specific entity or entity template with one or more suggested actions. For example, the entity-action map 170 may associate a phone number template with a "dial now" action, an email template with a "compose a new message" action, a street addresses template with a "view on map" action or a "search for a taxi/ride" action, etc. In some implementations, the entity-action map 170 may be further customized by the user 180. For example, the user of the mobile device may select a default action for each template (e.g., each type of entity template), such as associating email addresses with an "add to contacts" action instead of a "compose message" action.

As mentioned, the entity-action map may include multiple suggested actions for an entity, including entities matching an entity template. In some implementations, the action suggestion application 162 may use a ranking engine, such as ranking engine 164, to determine which action to select from the entity-action map. In some implementations, the ranking engine 164 may use the topicality score provided in the map 170. In some implementations, if an entity has four possible actions in the entity-action map 170, the ranking engine 164 may determine whether the mobile device 150 has any of the mobile applications that correspond to the actions installed. In some implementations, if only one of the four mobile applications that correspond to the actions is installed, the ranking engine 164 may select the action corresponding to the installed mobile application as the suggested action. In some implementations, the ranking engine 164 may determine which of the mobile applications is used most frequently on the mobile device 150 and select a suggested action that corresponds with the most frequently used mobile application 155. In some implementations, the user 180 may have indicated a preference for one of the suggested actions and the ranking engine 164 may select the action preferred by the user 180. In some implementations, the ranking engine 164 may return more than one suggested action, with a rank associated with each action. In such implementations, another program may select an action or may provide more than one action for selection by the user. In some implementations, the rank may be based on relevancy. In some implementations, the data used to rank the actions (e.g., the mobile application usage, user preferences, etc.) may be included in ranking data 176. In some implementations, the ranking data 176 may be part of a user profile stored at a server 110, with user permission. In some implementations, the ranking data 176 may include information about abandonment (e.g., past suggested actions that are not taken by the user) and may use this data to select which suggested actions to proceed with. In some implementations the ranking data 176 may also include information about previous action selections by the user. For example, the ranking data 176 may reflect how often the user 180 performs the action with a particular type of entity. This information may be used to boost that action for a particular entity type. In some implementations, the ranking data 176 may include information on source and destination applications. For example, the ranking data 176 may include information indicating that the user 180, or users in general, commonly move from one particular mobile application to another particular mobile application. When a suggested action corresponds with such information the ranking engine 164 may boost that suggested action. In some implementations, with user permission, ranking data 176 may be anonymized and provided to the server 110 so that the ranking engine 125 may use the aggregated data to update the entity-action map 132 or to rank new entries for the entity-action map 132.

In some implementations, the ranking engine 164 may also rank the entities identified in the captured image and select a subset of the identified entities. For example, a captured image may include many identified entities and providing a suggested action for each entity may result in a user interface that is too crowded and confusing to be useful. Accordingly, the ranking engine 164 may select a few (e.g., one, two, or three) entities that will have suggested actions. In some implementations, the number of selected entities may be a factor of screen size. For example, a mobile device 150 that is a tablet may allow for more action suggestions than a mobile device 150 that is a watch or smart phone. In some implementations, the ranking engine 164 may select only from entities that have an entry in the entity-action map, so that some entities without a corresponding action are automatically discarded. In some implementations, the ranking engine 164 may use the relevance of the entity to the current screen to select entities, so that entities that are prominent or highly relevant are selected. In some implementations, the ranking engine 164 may use the expected usefulness of actions associated with an entity (e.g., based on data in the ranking data 176). In some implementations, the ranking engine 164 may use the screen capture index, a user profile, or other ranking data to determine which entities are relevant to the user 180 of the mobile device 150. In some implementations, selection may not be necessary as only one entity may be selected via the gesture that initiates the action suggestion application 162, such as a long press on an area of the screen that represents the identified entity.

Once the system has selected, from the entity-action map, an action corresponding to an entity identified in the captured image, the action suggestion application 162 may provide a user-interface that offers the suggested action(s) to the user of the device in a manner consistent across mobile applications. In some implementations, the suggested actions may be in the form of a selectable control. The control can be an overlay displayed on top of the screen being displayed, an underlay displayed behind the screen being displayed, or information configured to be added to the current screen in the display buffer of the mobile device. In other words, the suggested action control represents information added to a screen generated at the mobile device, whether displayed over, under, or integrated into the screen when it is displayed.

The suggested action control may be configured to detect a selection that initiates the corresponding action (e.g., in the form of a deep link). The suggested action thus, acts like a hyperlink in an HTML-based document. Because the mobile action suggestion system 100 can provide the suggested action control for any mobile application running on the mobile device, actions are consistent across mobile applications. Although illustrated as executing on the mobile device 150, in some implementations, the action suggestion application 162 may be a module executing on a server, such as server 110. In such implementations, the screen capture application 160 may provide the entities identified in the captured image to the action suggestion application 162 at the server and the action suggestion application 162 may provide the screen capture application 160 with the corresponding action(s). In some implementations, the screen capture application 160 may use the corresponding action(s) to provide the interface that integrates the suggested action with the identified entity on the screen and makes the action selectable. In some implementations, the action suggestion application 162 may associate the suggested action control with screen coordinates that correspond to a location of the entity identified in the captured image. The coordinates may be selected to be near but not completely obscuring the associated entity in the captured image.

In some implementations, the screen capture application 160 may integrate the suggested action controls with a current screen. For example, if the screen capture application 160 receives the selected actions the screen capture application 160 may combine the selected action controls with the current display. In some implementations, the screen capture application 160 may generate an overlay, as an underlay, or may interleave the suggested action controls with the current screen in the display buffer. In some implementations, the screen capture application 160 may be configured to verify that the currently displayed screen is similar enough to the captured screen image before displaying the suggested action controls. For example, the screen capture application 160 may use the coordinates for the control or for the corresponding identified entity to determine a visual cue from the captured image and compare the visual cue with the same coordinates for the currently displayed image. In some implementations, the screen capture application 160 may be configured to look a short distance for visual elements in the current image that are similar to those for the visual cue. If found, the screen capture application 160 may adjust the coordinates of the suggested action controls to match the movement of the underlying screen. In some implementations, the screen capture application 160 may initiate an activity or mode that displays the captured image, the selected entity, and the actions on top of the current screen. The previously captured image, selected entity, and actions may be displayed until the user selects the action or cancels the display (e.g., with a cancel or 'go-back' command).

The mobile device 150 may include data stores 157, which are stored in the memory of the mobile device 150 and used by the mobile applications 155. In some implementations, the data stores 157 may include the entity-action map 170, the screen capture index 172, the knowledge base 174, and the ranking data 176. One or more of these data stores may be associated with a user account or profile. Thus, the data stores may also reside on server 110. In addition, one or more of the data stores 157 may be copies of or subsets of data stored on the server 110 or in another location specified by the user. The data stores 157 may be stored on any non-transitory memory. The ranking data 176 may include rankings for the various entities identified in the screen capture images. The rank of an entity with respect to a particular screen capture image may be stored, for example, as metadata in the screen capture index 172. In addition or alternatively, the rank of an entity may also represent the rank of an entity over a period of time e.g., how long an entity has been on the screen and whether the entity appeared in different contexts (e.g., different mobile applications). Thus, the ranking data 176 can include an indication of how relevant an entity is to the user. In some implementations, the ranking data 176 may include ranking data for entity types or collections of entities. For example, the ranking data 176 may include a rank for "horror movies" or "Italian restaurants". Thus, an entity that matches the type or is part of a collection may receive a ranking score that corresponds to the type or collection rank in the ranking data 176. In other words, entities may be grouped into collections and ranked based on the collection.

When stored in data stores 157 on the mobile device 150, the knowledge base 174 may be a subset of entities and relationships in knowledge base 134, especially if knowledge base 134 includes millions of entities and billions of relationships. For example, the entities and relationships in knowledge base 174 may represent the most popular entities and relationships from knowledge base 134, or may be selected based on user preferences. For example, if the user has a profile, entities and relationships may be selected for inclusion in knowledge base 174 based on the profile.

The mobile device 150 may be in communication with the server 110 and with other mobile devices 190 over network 140. Network 140 may be for example, the Internet, or the network 140 can be a wired or wireless local area network (LAN), wide area network (WAN), etc., implemented using, for example, gateway devices, bridges, switches, and/or so forth. Network 140 may also represent a cellular communications network. Via the network 140, the server 110 may communicate with and transmit data to/from mobile devices 150 and 190, and mobile device 150 may communicate with mobile device 190 (not shown).

The mobile action suggestion system 100 represents one example configuration and implementations may incorporate other configurations. For example, some implementations may combine one or more of the components of the emulator 120, the ranking engine 125, the action suggestion application 162, or the ranking engine 164 into a single module or engine. Similarly, some implementations may combine one or more of the screen capture application 160, the action suggestion application 162, and the ranking engine 164 into a single module or application. Furthermore, one or more of the components of the action suggestion application 162, the screen capture application 160, or the ranking engine 164 may be performed at the server 110, while one or more of the components of the emulator 120 or the ranking engine 125 may be performed at the mobile device 150. As another example one or more of the data stores, such as the mobile application manifests 136, the knowledge base 134, the application store data 130, or the entity-action map 132 may be combined into a single data store or may distributed across multiple computing devices, or may be stored at the mobile device 150. Likewise, one or more of the screen capture index 172 and the ranking data 176 may be stored at the server 110 or another location specified by the user.

To the extent that the mobile action suggestion system 100 collects and stores user-specific data or may make use of personal information, the users may be provided with an opportunity to control whether programs or features collect the user information (e.g., information about a user's social network, social actions or activities, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a mobile action suggestion system.

FIG. 2 illustrates an example display 200 of a mobile computing device. In the example of FIG. 2, the display is from a mobile application that provides news content, which may be part of a social media application or a mobile application provided by a newspaper, magazine, or other news service. The display may be a display of a mobile device, such as mobile device 150 of FIG. 1. The display 200 includes text and images that may represent entities. For example, entity 205 may be an image of an actor, entity 210 may be an image associated with a movie, such as a movie poster or the cover of a DVD. Thus, display 200 illustrates that entity mentions may be images and not necessarily associated with text. Entity 215 is the name of an actress in text. Other similar entities are also encircled by an oval. Entities 205, 210, and 215 may exist in a knowledge base. The knowledge base may include text equivalents for the entity, images associated with the entity, etc., so that the entity can be identified.

Entity 220 in display 200 is a date. The date entity 220 is an example of an entity that matches an entity template. Such entities may not be in the knowledge base. Instead, the system may identify these entities when they match an entity template. Other similar entities that match an entity template are phone numbers, street addresses, and email addresses. While the display 200 illustrates ovals around entity mentions in the display 200, such ovals are presented for ease of explanation and entity identification and may not actually be displayed to the user or be part of an image captured from the screen.

FIG. 3 illustrates an example display 300 of a mobile computing device with suggested actions added. A mobile action suggestion system, such as system 100 of FIG. 1 may capture the display 200 in an image, perform recognition on the image, find entities in the image and determine actions for the identified entities based on an entity-action map. The system may then provide data that can be displayed with the current screen to generate the suggested action controls. Thus, FIG. 3 illustrates the example display of FIG. 2 with suggested action controls added, in accordance with disclosed implementations.

In the example of FIG. 3, the system has selected two entities, entity 210 and entity 220 from FIG. 2, for suggested actions. As previously discussed, the selection may be based on a number of factors, such as whether the entity exists in the knowledge base or matches an entity template, past user actions for entities of the same type, relevance of the entity for the user, topicality of the entity to the page, etc. For the two selected entities, the system has generated a suggested action control. Suggested action control 305 corresponds with entity 210. If selected, suggested action control 305 may open a Hollywood wiki mobile application to a page about entity 210. If the user has not installed the Hollywood wiki mobile application, suggested action control 305 may suggest installing the Hollywood wiki mobile application (not illustrated). Thus, the selection of the suggested action may cause the mobile device to open a mobile application store to the interface used to install the mobile application. In another implementation, the action may begin install directly (e.g., without going to the mobile application store). In this manner, the system can suggest appropriate or popular applications that deal with the entity that the user may not know about. For example, if the entity is a restaurant, the system can suggest installing a mobile application that includes restaurant reviews and/or allows the user to make a reservation.

In some implementations, the suggested action control 305 may include more than one action. For example, the suggested action control 305 may include an action for buying tickets to see the movie. In some implementations, the action for buying tickets may be displayed in place of the Hollywood wiki action when a movie is a new release. In other words, the system may use context to select which action to display. In some implementations the system may alternate which action is displayed, keeping track of whether the action is ignored or selected to learn user preferences. In some implementations, the system may present multiple options until the system learns which options the user prefers. The user preference information may be kept as part of the ranking data used to select actions for display to the user.

The display 300 also includes suggested action control 310. Control 310 corresponds to an entity that matches an entity template. The action may be determined by which entity template the entity matches. Thus, for example, a date may have a suggested action that causes the mobile device, when the action control is selected, to open a calendar mobile application. In some implementations, the action may also fill in default values based on the entity, so the user only needs to save the calendar entry. While control 305 is illustrated as a text-based control and control 310 is illustrated as an image or icon based control, control 305 could be image or icon based and control 310 could be text based, or each could be a combination of text and image based. Thus, the action controls are understood to include text based, image based, or a combination of text and image controls.

Figure 4:
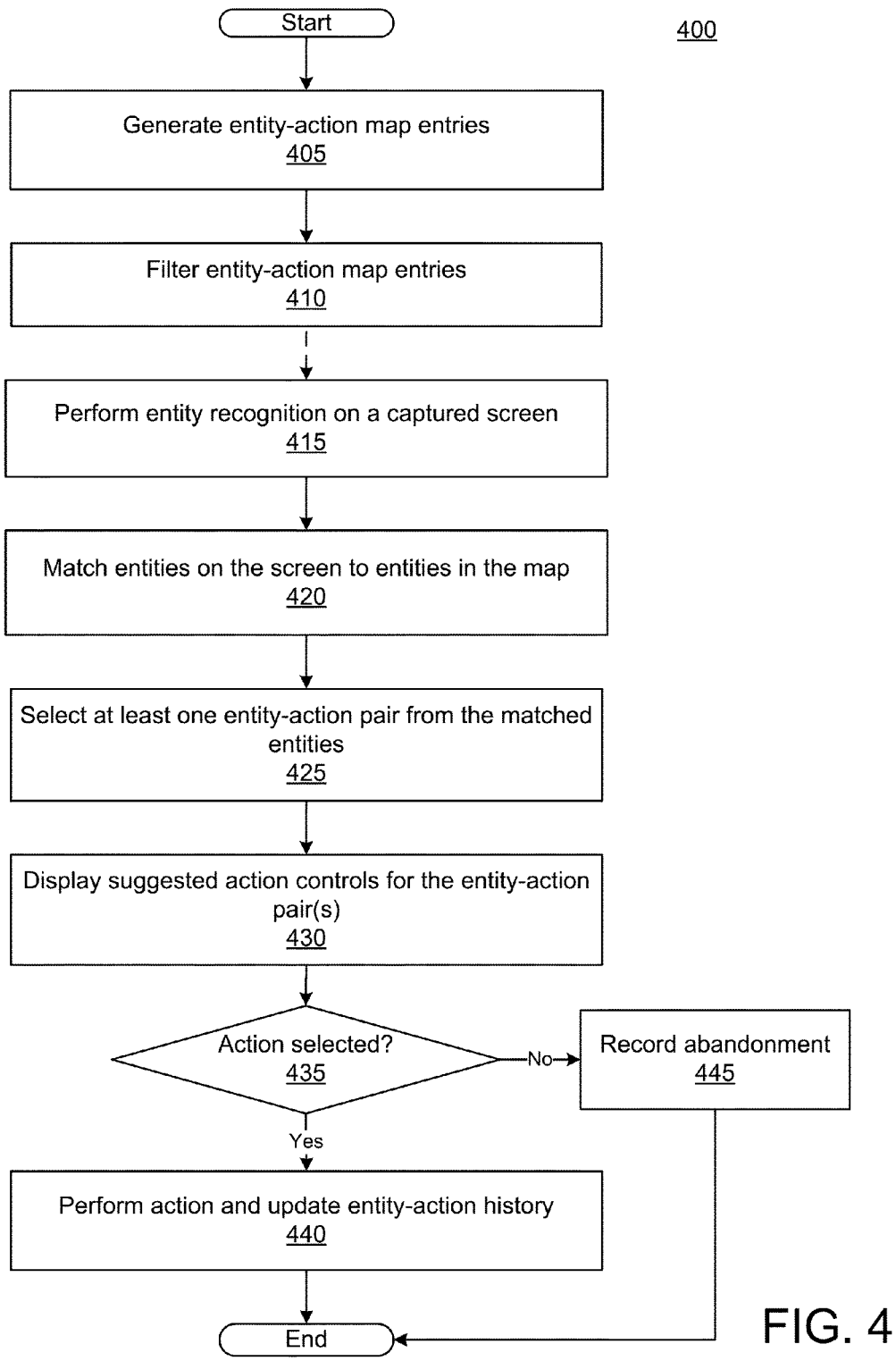
FIG. 4 illustrates a flow diagram of an example process for suggesting actions for entities displayed on a mobile computing device, in accordance with disclosed implementations.
Figure 5:
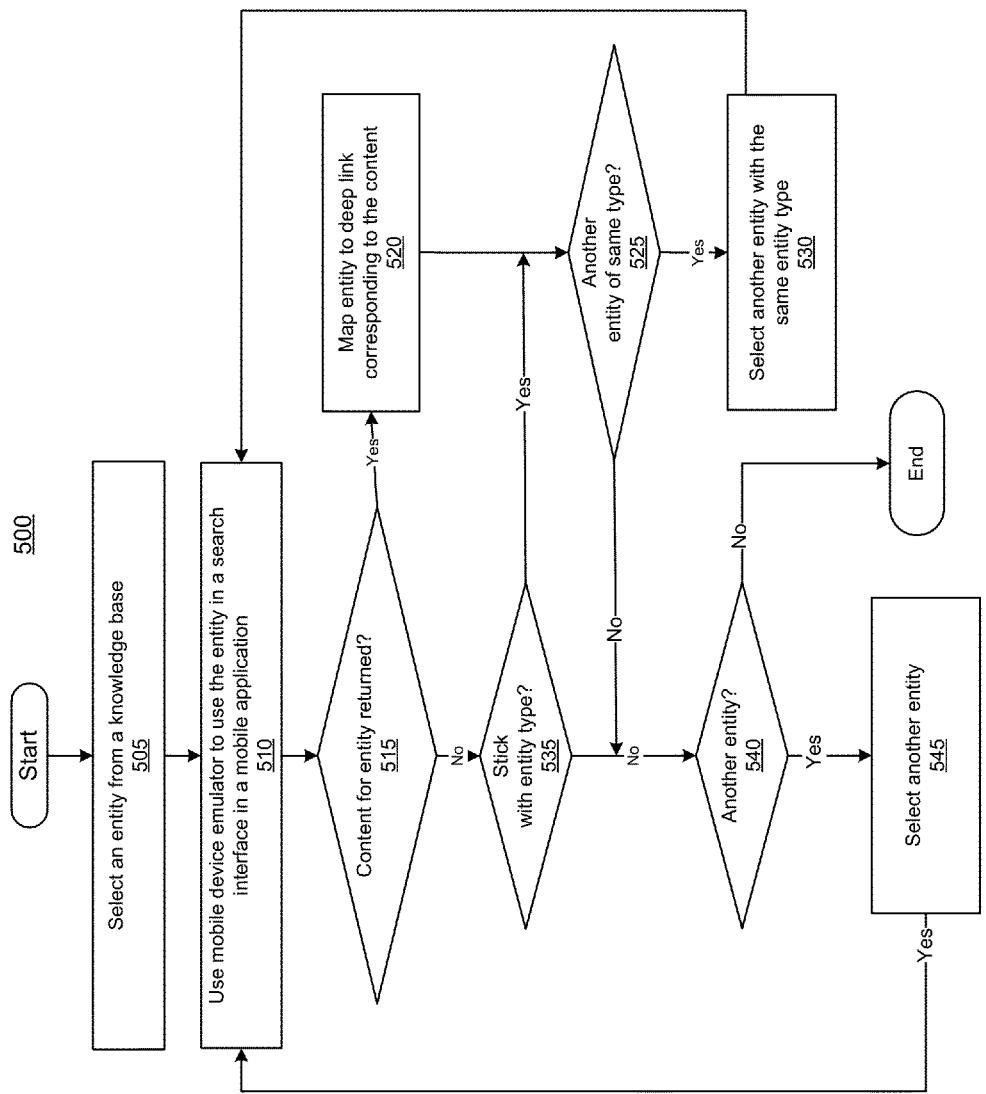
FIG. 5 illustrates a flow diagram of an example process for populating an entity-action table, in accordance with disclosed implementations.
Figure 6:
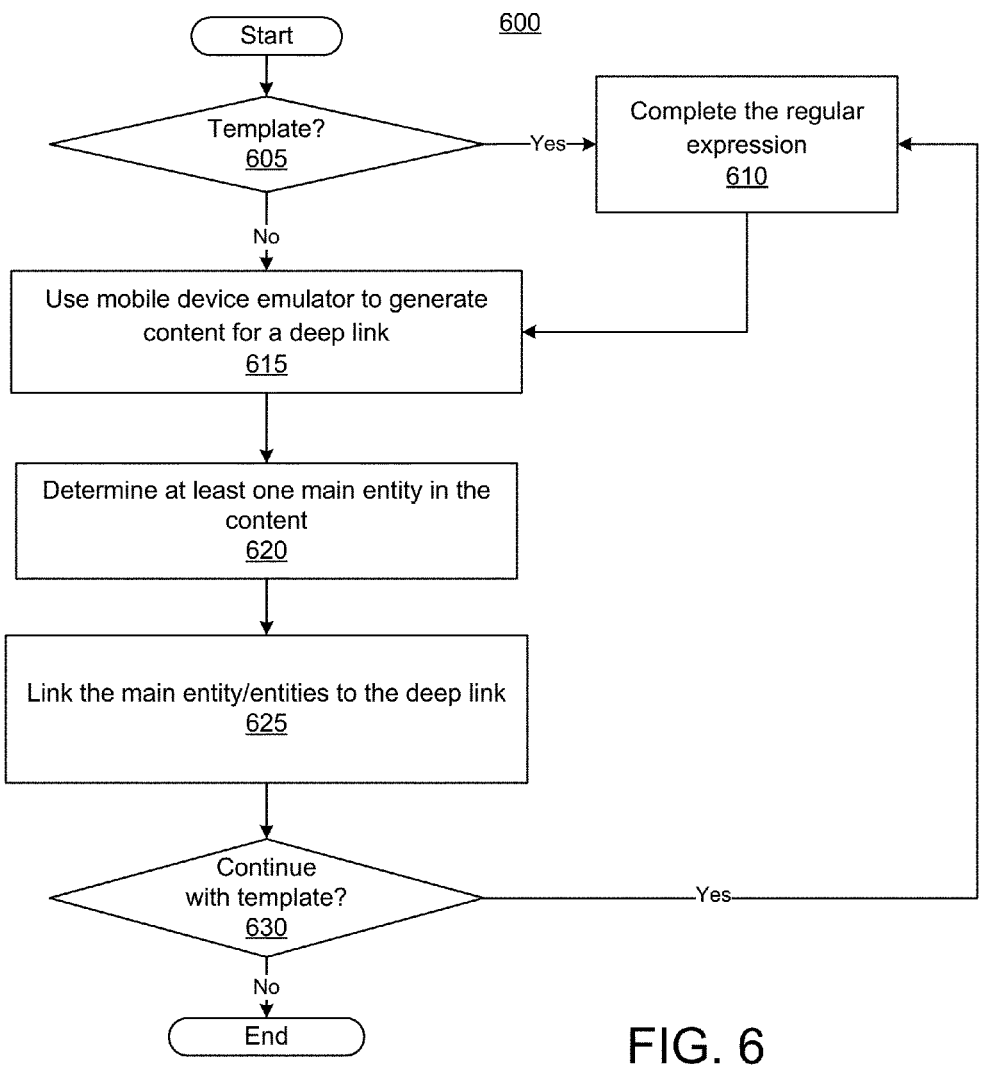
FIG. 6 illustrates a flow diagram of another example process for populating an entity-action table, in accordance with disclosed implementations.

FIG. 4 illustrates a flow diagram of an example process 400 for suggesting actions for entities displayed on a mobile computing device, in accordance with disclosed implementations. Process 400 may be performed by a mobile action suggestion system, such as system 100 of FIG. 1. Process 400 may be used to map entities to actions, to identify entities in a screen capture image from a mobile device and to generate suggested action controls that provide an action for some of the entities. Process 400 may begin by generating entity-action map entries (405). The entity-action map may map an entity to one or more actions. The actions represent deep links for mobile applications. In addition to mapping an entity to the action, the entity-action map entries may include ranking information, a text description of the action, and other metadata about the entity-action pair. In some implementations, the entry may also include an alternate text description and action, which may represent the description displayed for the user when the user has not yet installed the mobile application. The entry may also include a secondary action that initiates install of the mobile application on the mobile device when selected, making it easy for the user to install a suggested application. FIGS. 5 and 6 illustrated two example methods of generating entries in the entity-action map. In some implementations, the system may add The system may then filter the entity-action map entries (410). Filtering may be needed to keep the size of the map manageable. Filtering may be based on a rank calculated from a number of signals, such as a topicality score of the entity with regard to the content represented by the deep link and mentions of the mobile application and the entity name in documents, such as web pages (with such co-occurrence boosting the rank). Signals may also include information about the mobile application associated with the deep link, such as the number of downloads of the application (more downloads results in a higher rank), the ratings given by users who have downloaded the application (higher rankings leading to a higher rank), etc. Other ranking signals may include web-based ranking signals for a web-page equivalent of a mobile application. For example, a popular web page mirror may boost the rank of a corresponding mobile application. In some implementations, the Page Rank of the web page mirror can be used. Other ranking signals may be based on data collected about past suggested actions. For example, the system may aggregate data on which actions users in general select for particular entity types. The more often users use a particular application for a particular entity type, the higher the ranking of an entity-action pair that includes an entity of that particular entity type and a deep link involving the particular application.

The system may use the rank to reduce the number of actions kept per entity. For example, the system may keep only the top four or six actions, as determined by the rank, for an entity. In some implementations, the rank or information used to calculate the rank may be stored with the entity-action pair in the map entry. In some implementations, the entity-action map or a portion thereof may be pushed to mobile devices. The system may perform steps 405 and 410 on an on-going basis. For example the system may perform steps 405 and 410 as new mobile applications are added to an application store or as information for existing applications is updated, at regular intervals, etc. Thus, it is understood that steps 405 and 410 may be performed an on-going basis.

FIG. 5 illustrates a flow diagram of an example process 500 for populating an entity-action table, in accordance with disclosed implementations. Process 500 may be performed by an emulator in a mobile action suggestion system, such as system 100 of FIG. 1. Process 500 may be used to discover deep links and their associated entities via "crawling" a mobile application via a search user interface provided in the mobile application. Discovering the deep links may be performed, for example, as part of step 405 of FIG. 4. Process 500 may begin by selecting an entity from a knowledge base (505). In some implementations, the selected entity may be of a particular entity type, as it is known what types of entities the mobile application works with. However, the system, via process 500, could still crawl the mobile application with random entity types if such information was not known. The system may use a mobile device emulator to submit a text equivalent of the entity in a search user interface (e.g., search intent) in a mobile application (510). The emulator may be configured to mimic an operating system of a mobile device and configured to determine system and application variables active for a particular user interface. The system may then determine whether the search request returned content for the entity (515). For example, if the mobile application returns a "no information found" or "unavailable" or similar message, no content is found for the entity (515, No).

If content is found (515, Yes), the system may map the entity (e.g., via an entity identifier) to a deep link corresponding to the content (520). The deep link may represent the search interface with the search intent or search input box pre-populated with the entity description, so that the system can submit the search when a suggested action control is selected by a user, or the deep link may represent the content returned as a result of the search, so that activation of the suggested action control goes to the content directly without having to submit the search. In some implementations, the deep link may be an identifier that encodes the application identifier and data used to start the application in a particular state as defined by the application developer). In some implementations, the deep link may be a list of variable-value pairs (e.g., XML elements) that, when provided to the mobile application, cause the mobile application to display the content (i.e., the content returned responsive to the search) or that correspond to the populated search interface (e.g., search intent). The system may map the entity to the deep link by adding an entry to the entity-action map. The entry may identify the entity and the deep link. The system may also add a description for the action, which may be related to the mobile application (e.g., "open with ReserveIt mobile app"). In some implementations the description may be hand curated at a later time. The system may also add a secondary description and a secondary deep link that correspond to downloading and installing the mobile application, so that the user can be offered the opportunity to download the application as the action if the user does not have the application installed. In some implementations, the secondary action may be added after filtering (e.g., after the entity-action pair is selected as one of the top actions for the entity).

Having found an entity that activates content for the mobile application, the system may intelligently begin selecting entities from the knowledge base by selecting entities of the same entity type (525). For example, if the mobile application being tested is a reservation application, the system may discover that a restaurant entity returns content. Accordingly, the system may continue to test other restaurant entities, rather than selecting random entities for testing from the knowledge base. Thus, the system may determine if there is another entity of the same entity type (525). If so (525, Yes), the system may select another entity of the same entity type (530), and determine whether a search using that entity brings up content (510, 515), as described above.

If an entity of the same entity type does not result in content using the search interface (515, No), the system may determine whether to stay with the same entity type or not (535). The system may stay with the same entity type (535, Yes) if a previous entity of that type did result in content. If the system does not stay with the same entity type (535, No), or once entities have been exhausted (525, No), the system may determine whether to continue testing entities (540). For example, in some implementations, the system may test all entities and may continue as long as an entity in the knowledge base has not been tested. In some implementations, the system may test a subset of entities of each type. For example, the system may test 100 or 200 or 1000 entities of a particular type and may conclude, if none of the entities of that type produce content, that no more entities of that type need to be tested.

In some implementations, the system may know ahead of time which entity types are valid for the mobile application. For example, the mobile application developer may provide an entity type as part of the application manifest. In such situations, the system may only test entitles of the specified type, and determining whether another entity exists is limited to entities of the specified type(s). If there are other entities to test (540, Yes), the system may select another entity from the knowledge base (545) and continue testing at 510 as explained above. When there are no other entities to test for this mobile application (540, No), process 500 ends.

FIG. 6 illustrates a flow diagram of another example process 600 for populating an entity-action table, in accordance with disclosed implementations. Process 600 may be performed by an emulator in a mobile action suggestion system, such as system 100 of FIG. 1. Process 600 may be used to discover the entities associated with deep links provided by the mobile application developer. For example, the mobile application developer may expose the deep links for the mobile application, for example, as part of the application manifest. The deep links exposed by the developer may be a list of deep links or a template-based deep link. For example, the deep link can be a set of variable-value pairs (e.g., XML elements). As another example, the deep link may be a single variable-value pair (e.g., XML element) with a regular expression. Such a deep link may be referred to as a deep link template. In some implementations, the deep link template may also specify or be associated with an entity type. Discovering the entities associated with developer provided deep links may be performed, for example, as part of step 405 of FIG. 4.

If the deep link is a deep link template (605, Yes), process 600 may begin by completing the regular expression (610). As one example, the deep link template may be bookit:// hotel/[0-9]{3}. The regular expression in this example specifies that the deep link ends with a three digit identifier. The system may complete the regular expression by substituting a three digit identifier at the end. The system may loop through each valid three digit identifier (e.g., via 630, No) when expanding the regular expression. Of course, the regular expression may include characters or digits or a combination of these. In some implementations, the completion may be with an entity selected of an entity type associated with or specified for the template. For example, the regular expression may specify a type of entity and the system may complete the regular expression by substituting an entity identifier or entity description, etc. In some implementations, the system may use information from a web mirror to complete the regular expression. For example, a mobile application from bookit may have a corresponding website that includes the same kind of actions performed in the mobile application. The system may know that the web mirror site supports a set of entities (e.g., certain entity identifiers) that fit the regular expression. The system may then use the set to constrain the quantity of deep links generated, e.g., by only using entities in the set to complete the regular expression. The system may then use a mobile device emulator to generate content for the deep link (615). The emulator may function as described above, resulting in content generated by the mobile application. The system may determine at least one main entity in the returned content (620). For example, the emulator may include a screen capture application as described above with regard to FIG. 1 that performs entity detection on the text and images that comprise the content. Thus, the system may discover one or more entities in the content. The system may also select only main entities, e.g., those with a topicality score that satisfies (e.g., meets or exceeds) a threshold. The system may then link any main entities found with the deep link (625) by adding the entity-deep link pair as an entry in the entity-action map. As previously discussed, the map may also include a description, metadata reflecting a score for the entity-action pair, a secondary action and description etc. If the deep link was generated from a deep link template (630, Yes), the system may continue to complete the regular expression (610) as described above, until possible combinations have been exhausted (630, No). Process 600 then ends, although it is understood the system may perform process 600 for each deep link/deep link template provided by the application developer.

Returning to FIG. 4, independently of steps 405 and 410, the system may perform entity recognition on a captured screen (415) of a mobile device. The entity recognition may be triggered by a user action. For example, the action may be a predefined gesture such as swipe up or down or a multi-finger tap or a long press, etc. In some implementations, the user action may be selection of a widget or menu option. In response to the action, the system may receive an image of a screen captured on the mobile device. The captured image may be obtained using conventional techniques. The system may identify entities in the captured screen by performing entity recognition using conventional techniques. Entity recognition may include identifying text characters or numbers, landmarks, logos, etc., and matching the text, landmark, or logo to an entity in a knowledge base or matching the text to an entity template. Thus, entities may be recognized via words as well as images and logos, etc.

The system may match identified entities to entities in the entity-action map (420). When the entity is in a knowledge base, the system may use an identifier for the entity to locate matching entries in the map. When the entity matches an entity template, the system may use the entity template to find corresponding actions in the map. The system may select at least one entity-action pair from the matching entries (425). For example, if the screen size is small and many entities were identified, the system may filter the entities based on topicality of the entity to the screen content, relevance of the entity to the user, past selection of actions for entities of the same type, etc. Thus, the system may reduce the number of entities that display a corresponding suggested action control. In some implementations, the user action that initiated the action suggestion process may implicitly select an entity. For example, a long press on the image of an actor may be an implicit selection of that actor and the system may only provide suggested action(s) for that actor.

In addition to filtering entities, the system may filter the actions. For example, each entity may be mapped to multiple corresponding actions (e.g., in the form of deep links). The system may filter the actions for an entity based on a number of factors, such as whether the user has the corresponding mobile installed, how frequently the user uses the mobile application, past suggestions of the action (e.g., if the user has ignored the action in the past it may receive a lower rank but if the user often selects the action it may receive a higher rank) for the entity type etc. The system may also filter the actions based on explicit user preference or context. Once entities and actions for the entities have been filtered, the system may have selected entity-action pairs for suggested actions.

In some implementations, the action selected for an entity may be associated with a mobile application that is not installed on the mobile device. When this occurs, the action for the selected entity may be a secondary action (a secondary deep link) that, when selected, takes the user to an interface where the user can download and install the mobile application, or initiates installation of the mobile application automatically. Thus, it is understood that the entity-action pair may represent a secondary action that enables the user to install the mobile application. In some implementations, after the mobile application is successfully installed the system may use the deep link from the entity-action map to open the installed mobile application. This, in such implementations, selection of the suggested action control may initiate the secondary action first and then the primary action next.

The system may display a suggested action control for each entity-action pair selected (430). The suggested action control may include text that identifies the action for the user. The suggested action control may also be selectable, for example selected using a tap, press, or click, etc. The system may determine whether the user selects one of the actions (435). For example, the user may select an area outside of the selectable controls, which may be interpreted as an abandonment. In some implementations, some other user gesture without selection of a control may indicate abandonment. If the user does not select a suggested action (435, No), the system may record an abandonment (445) for the entity-action pairs associated with the suggested actions displayed. The abandonment may be recorded in ranking data for the user and may demote or down-weight the action for the user a next time. If the user selects a suggested action control (453, Yes), the system may receive the selected action and may initiate the corresponding action (440). Initiating the action may include using the deep link to open the mobile application to content represented by the deep link. In other words, more than just switching focus to a home screen in the mobile application, the deep link causes the mobile application to open to particular content within the mobile application. For example, if an actor is selected, the particular content may be a biographical page about the actor in a Hollywood Wiki mobile application. In some implementations, the deep link may represent a search user interface with the search intent populated by a text equivalent of the entity. In some implementations, the action may initiate install of a mobile application. The system may also record the entity-action pairs in a history (440), which can be used, with user permission, to customize the suggested actions. In some implementation the history may be stored as part of ranking data, for example ranking data 176 of FIG. 1. The pairs may include an indication of whether the user selected the suggested action control or not. For example, the system may learn, through the history, that the user prefers certain mobile applications or prefers suggested actions for particular entity types. Likewise, the system may discover that the user never selects an action with a particular mobile application and may stop using that action as a suggested action for this particular user. Accordingly, the system may update the ranking data used by the ranking engine. In some implementations, the system may provide history data to a server to assist maintenance/generation of entity-action map entries. Process 400 then ends, until the user provides a user action that causes the system to perform step 415 again, with a different screen capture.

As indicated earlier, process 400 can provide a consistent user-interaction experience across all mobile applications running on the mobile device, so that similar types of entities act the same regardless of the mobile application that produced the content. Of course, a user may choose to turn the screen capture feature off, which may prevent portions of process 400 from running.

FIG. 7 illustrates a flow diagram of an example process 700 for displaying suggested action controls displayed on a mobile computing device, in accordance with disclosed implementations. Process 700 may be performed as part of step 430 of FIG. 4.

The system may generate a suggested action control for each of the entity-action pair(s) identified (705). The control can be a pop-up window, an icon a link, or some other visual cue that identifies a region of the screen as selectable and provides an indication of what occurs when selected. In some implementations, the appearance of the control may provide an indication of the type of action. For example, entities may have a control using a first color, phone numbers may have a control using a second color, websites using a third color, email addresses using a fourth color, street addresses using a fifth color, etc. Each control is selectable, meaning that if the user of the mobile device touches the screen above the visual cue, the mobile device will receive a selection input which triggers or initiates the action associated with the control. For example, if the user touches the screen above the control 305 of FIG. 3, the system may open a Hollywood Wiki mobile application to content that pertains to the entity 210. Of course, the control may include options for two actions and the system may prompt the user of the mobile device to select one of the actions.

Each control may have coordinates that indicate where on the screen the entity associated with the control is located. In some implementations, each control may also have image data of the captured screen image that corresponds to the coordinates of the underlying entity. In other words, the control may include a portion of the screen capture image that corresponds to the entity of the entity-action pair for the suggested action control. In some implementations, the mobile device may have access to the screen capture image the action-entity pair was generated for and may not need to associate the image data with the control, as the system can determine the image data from the screen capture image using the coordinates. In another implementation, the system may store one portion of the screen capture image and its coordinates as a reference point. The coordinates and portion of the screen capture image may help the system determine whether or not to display the suggested action control with a current screen. If a server generates the entity-action pairs, the server may provide the entity-action pairs and the corresponding entity coordinates to the mobile device.

At the mobile device, the system may determine whether the suggested action control matches the current screen (710). For example, if the mobile application currently running (e.g., the mobile application that is generating the current screen) is different from the mobile application that generated the screen capture image used to determine the entity-action pairs, the system may determine the control does not match the current screen. As another example, the system may use the screen coordinates or partial image data for at least some of the suggested action controls to determine if the currently displayed screen is similar to the screen capture image for which the suggested action control was generated. For example, the system may match the image portion that corresponds with an entity for a control with the same portion, using screen coordinates, of the current screen. If the image data for that portion does not match, the system may determine that the suggested action control does not match the current screen. As another example, the suggested action control may include a fiducial mark, e.g., one portion of the screen capture image used to identify the entity associated with the suggested action control and the system may only compare the fiducial mark with the corresponding portion of current screen. In either case, if the user has scrolled, zoomed in, or zoomed out, the current screen may not match the screen used to generate the suggested action control. In some implementations, the system may look for the fiducial mark or a reference point in the current image close by the coordinates of the entity and may shift the display of the suggested action control accordingly. In such a situation the system may determine that the current screen and the suggested action control do match.

If the suggested action control and the current screen match (710, Yes), the system may display the suggested action control with the current screen (715). If the suggested action control and the current screen do not match (710, No), the system may not display the suggested action control with the current screen and process 700 ends for the screen capture image.

It is noted here, yet also applicable to various of the embodiments described herein, that capabilities may be provided to determine whether provision of annotation data (and/or functionality) is consistent with rights of use of content, layout, functionality or other aspects of the image being displayed on the device screen, and setting capabilities accordingly. For example, settings may be provided that limit content or functional annotation where doing so could be in contravention of terms of service, content license, or other limitations on use. Such settings may be manually or automatically made, such as by a user when establishing a new service or device use permissions, or by an app installation routine or the like.

FIG. 9 shows an example of a generic computer device 900, which may be operated as server 110, and/or client 150 of FIG. 1, which may be used with the techniques described here. Computing device 900 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 900 includes a processor 902, memory 904, a storage device 906, and expansion ports 910 connected via an interface 908. In some implementations, computing device 900 may include transceiver 946, communication interface 944, and a GPS (Global Positioning System) receiver module 948, among other components, connected via interface 908. Device 900 may communicate wirelessly through communication interface 944, which may include digital signal processing circuitry where necessary. Each of the components 902, 904, 906, 908, 910, 940, 944, 946, and 948 may be mounted on a common motherboard or in other manners as appropriate.

The processor 902 can process instructions for execution within the computing device 900, including instructions stored in the memory 904 or on the storage device 906 to display graphical information for a GUI on an external input/output device, such as display 916. Display 916 may be a monitor or a flat touchscreen display. In some implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In some implementations, the memory 904 may include expansion memory provided through an expansion interface.

The storage device 906 is capable of providing mass storage for the computing device 900. In one implementation, the storage device 906 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 904, the storage device 906, or memory on processor 902.

The interface 908 may be a high speed controller that manages bandwidth-intensive operations for the computing device 900 or a low speed controller that manages lower bandwidth-intensive operations, or a combination of such controllers. An external interface 940 may be provided so as to enable near area communication of device 900 with other devices. In some implementations, controller 908 may be coupled to storage device 906 and expansion port 914. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 930, or multiple times in a group of such servers. It may also be implemented as part of a rack server system. In addition, it may be implemented in a computing device, such as a laptop computer 932, personal computer 934, or tablet/smart phone 936. An entire system may be made up of multiple computing devices 900 communicating with each other. Other configurations are possible.

FIG. 10 shows an example of a generic computer device 1000, which may be server 110 of FIG. 1, which may be used with the techniques described here. Computing device 1000 is intended to represent various example forms of large-scale data processing devices, such as servers, blade servers, datacenters, mainframes, and other large-scale computing devices. Computing device 1000 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1000 may include any number of computing devices 1080. Computing devices 1080 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1080a includes multiple racks 1058a-1058n. Each rack may include one or more processors, such as processors 1052a-1052n and 1062a-1062n. The processors may include data processors, network attached storage devices, and other computer controlled devices. In some implementations, one processor may operate as a master processor and control the scheduling and data distribution tasks. Processors may be interconnected through one or more rack switches 1058, and one or more racks may be connected through switch 1078. Switch 1078 may handle communications between multiple connected computing devices 1000.

Each rack may include memory, such as memory 1054 and memory 1064, and storage, such as 1056 and 1066. Storage 1056 and 1066 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1056 or 1066 may be shared between multiple processors, multiple racks, or multiple computing devices and may include a computer-readable medium storing instructions executable by one or more of the processors. Memory 1054 and 1064 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1054 may also be shared between processors 1052*a*-1052*n*. Data structures, such as an index, may be stored, for example, across storage 1056 and memory 1054. Computing device 1000 may include other components not shown, such as controllers, buses, input/output devices, communications modules, etc.

An entire system, such as system 100, may be made up of multiple computing devices 1000 communicating with each other. For example, device 1080*a* may communicate with devices 1080*b*, 1080*c*, and 1080*d*, and these may collectively be known as system 100. As another example, system 100 of FIG. 1 may include one or more computing devices 1000. Some of the computing devices may be located geographically close to each other, and others may be located geographically distant. The layout of system 1000 is an example only and the system may take on other layouts or configurations.

According to certain aspects of the disclosure, a mobile device includes at least one processor and memory storing instructions that, when executed by the at least one processor, cause the mobile device to perform operations. The operations include identifying, in response to a user request, at least one entity in content generated by a mobile application, identifying an action mapped to the at least one entity, the action representing a deep link into a second mobile application, and providing a control that allows the user to initiate the action for the entity.

This and other aspects can include one or more of the following features. For example, the second mobile application may not be installed on the mobile device. When the second mobile application is not installed on the mobile device the memory may further store instructions that, when executed by the at least one processor, causes the mobile device to, in response to determining that the second mobile application is not installed, receive a selection of the control, download and install the second mobile application on the mobile device, and use the deep link to open the second mobile application after installation. As another example, the operations may also include receiving a selection of the control and upweight the mapping between the at least one entity and the action for the user. As another example, the operations may also include receiving a command clearing the control without selection and down-weighting the mapping between the at least one entity and the action for the user. As another example, the action may be a first action and the operations may also include determining that the at least one entity is mapped to the first action and to a second action, the second action representing a second deep link into a third mobile application, determining that the second mobile application is installed on the mobile device but the third mobile application is not and selecting, in response, the first action over the second action.

As another example, the action may be a first action and the operations may also include determining that the at least one entity is mapped to the first action and to a second action, the second action representing a second deep link into a third mobile application, determining that the user uses the second mobile application more frequently than the third mobile application, and select, in response, the first action over the second action. As another example, the action may be a first action and the operations may also include determining that the at least one entity is mapped to the first action and to a second action, the second action representing a second deep link into a third mobile application, determining that the entity has a higher topicality score with respect to the second mobile application than the third mobile application, and selecting, in response, the first action over the second action.

According to certain aspects of the disclosure, a method includes running a mobile device emulator with a deep-link for a mobile application, determining a main entity for the deep link, mapping the main entity to the deep link, storing the mapping of the main entity to the deep link in a memory, and providing the mapping to a mobile device, the mapping enabling a user of the mobile device to select the deep link when the main entity is displayed on a screen of the mobile device.

This and other aspects can include one or more of the following features. For example, the method may also include ranking the mapping based on attributes of the mobile application in an application store, wherein providing the mapping occurs when the ranking satisfies a threshold. As another example, the deep-link may be generated based on a deep-link template provided by a developer of the mobile application and/or the deep-link may be generated based on a deep-link list provided by a developer of the mobile application. In some such implementations, the method may also include generating a plurality of deep links from the template, determining, for each of the plurality of deep links, whether the deep link is valid and, when the deep link is valid, a main entity for the deep link, mapping respective main entities to deep links, and storing the mappings in the memory.

As another example, the mobile application may be a first mobile application and the mobile device uses the mapping to identify a deep link mapped to at least one entity recognized in a second mobile application running on the mobile device and to provide a control that allows a user to navigate to the deep link in the first mobile application. As another example, the method may include selecting an entity from a knowledge base for input into a search intent for the mobile application prior to running the mobile device emulator, wherein running the mobile device emulator includes using the emulator to submit the search using the entity, and performing the mapping, storing, and ranking when the mobile application returns content for the entity.

According to certain aspects of the disclosure, a method includes identifying, in response to a user gesture on a mobile device, at least one entity in content generated by a mobile application, identifying an action mapped to the at least one entity, the action representing a deep link into a second mobile application, and providing a control that allows the user to initiate the action for the entity.

This and other aspects can include one or more of the following features. For example, the second mobile application may not be installed on the mobile device. In some such implementations, the method further includes receiving a selection of the control, and downloading and installing the second mobile application on the mobile device. As another example, the entity may match an entity template and the entity is mapped to the action via the entity template. As another example, the entity is a first entity of a plurality of entities identified in the content, and the method further includes selecting the first entity from among the plurality of entities based on relevance to the user. As another example, the entity is a first entity of a plurality of entities identified in the content, and the method further includes selecting the first entity from among the plurality of entities based on topicality to the content. As another example, the action is a first action and the method may also include determining that the at least one entity is mapped to the first action and to a second action, the second action representing a second deep link into a third mobile application, determining that the user uses the second mobile application more than the third mobile application, and selecting, in response, the first action over the second action.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
   at least one processor;
   a mapping table identifying entity-action pairs, the action in an entity-action pair representing a deep link into a mobile application, wherein at least some entity-action pairs in the mapping table have a topicality score and a ranking that satisfies a threshold, the ranking being based on the topicality score for the entity-action pair and attributes of the mobile application in an application store; and
   memory storing instructions that, when executed by the at least one processor, cause the mobile device to:
      identify, in response to a user request, a plurality of entities at least one entity in content generated by a first mobile application,
      identify, using the mapping table, a plurality of entity-action pairs in the mapping table for the at least one entity,
      select an action from the plurality of entity-action pairs based in part on the respective topicality scores and the rankings that satisfy the threshold, the action representing a deep link into a second mobile application, and
      provide a control that allows the user to initiate the action for the entity.

2. The mobile device of claim 1, wherein the mapping table is stored on the mobile device.

3. The mobile device of claim 1, wherein the second mobile application is not installed on the mobile device and wherein the memory further stores instructions that, when executed by the at least one processor, causes the mobile device to:
   receive a selection of the control;
   download, responsive to the selection, and install the second mobile application on the mobile device; and
   use the deep link to open the second mobile application after installation.

4. The mobile device of claim 1, wherein the memory further stores instructions that, when executed by the at least one processor, causes the mobile device to:
   receive a selection of the control; and
   upweight the mapping between the at least one entity and the action in the mapping table.

5. The mobile device of claim 1, wherein the memory further stores instructions that, when executed by the at least one processor, causes the mobile device to:
   receive a command clearing the control without selection; and
   down-weight the mapping between the at least one entity and the action in the mapping table.

6. The mobile device of claim 1, wherein the topicality score for an entity-action pair represents importance of the entity to content represented by the deep link.

7. The mobile device of claim 1, wherein the action is a first action and the plurality of entity-action pairs includes a second action that represents a second deep link into a third mobile application and the memory further stores instructions that, when executed by the at least one processor, causes the mobile device to:
   determine that the at least one entity is mapped to the first action and to a second action, the second action representing a second deep link into a third mobile application;
   determine that the user uses the second mobile application more frequently than the third mobile application; and
   select, in response, the first action over the second action.

8. The mobile device of claim 1, wherein the action is a first action and the plurality of entity-action pairs includes a second action that represents a second deep link into a third mobile application and the memory further stores instructions that, when executed by the at least one processor, causes the mobile device to:
   determine that the at least one entity is mapped to the first action and to a second action, the second action representing a second deep link into a third mobile application;
   determine that the entity has a higher topicality score with respect to the second mobile application than the third mobile application; and
   select, in response, the first action over the second action.

9. A method comprising:
   running a mobile device emulator with a deep-link for a mobile application;
   determining a main entity for the deep link;
   mapping the main entity to the deep link;

ranking the mapping based on a topicality score for the entity and attributes of the mobile application in an application store, determining the ranking satisfies a threshold; and responsive to the determination that the ranking satisfies the threshold:

storing the mapping of the main entity to the deep link in a memory, and providing the mapping to a mobile device, the mapping enabling a user of the mobile device to select the deep link when the main entity is displayed on a screen of the mobile device.

10. The method of claim 9, wherein ranking the mapping is also based on web-based ranking signals for a web-page equivalent of the mobile application.

11. The method of claim 9, wherein the deep-link is generated based on a deep-link template provided by a developer of the mobile application.

12. The method of claim 9, wherein the deep-link is generated based on a deep-link list provided by a developer of the mobile application.

13. The method of claim 9, wherein the deep-link is generated based on a deep-link template provided by a developer of the mobile application, and the method further comprises:

generating a plurality of deep links from the template;

determining, for each of the plurality of deep links, whether the deep link is valid and, when the deep link is valid, a main entity for the deep link;

mapping respective main entities to deep links; and storing the mappings in the memory.

14. The method of claim 9, wherein the mobile application is a first mobile application and wherein the mobile device uses the mapping to identify a deep link mapped to at least one entity recognized in a second mobile application running on the mobile device and to provide a control that allows a user to navigate to the deep link in the first mobile application.

15. The method of claim 9, further including:

selecting an entity from a knowledge base for input into a search intent for the mobile application prior to running the mobile device emulator, wherein running the mobile device emulator includes using the emulator to submit the search using the entity, and performing the mapping, storing, and ranking when the mobile application returns content for the entity.

16. A method comprising:

identifying, in response to a user gesture on a mobile device, at least one entity in content generated by a first mobile application;

identifying, using a mapping table identifying entity-action pairs, a plurality of entity-action pairs in the mapping table for the at least one entity, the action in an entity-action pair representing a deep link into a mobile application, wherein at least some of the plurality of entity-action pairs in the mapping table have a topicality score and a ranking that satisfies a threshold, the ranking being based on the topicality score for the entity-action pair and attributes of the mobile application in an application store; each entity-action pair having a respective topicality score in the mapping table;

selecting an action from the plurality of entity-action pairs based in part on the respective topicality scores and the rankings that satisfy the threshold, the action representing a deep link into a second mobile application; and providing a control that allows the user to initiate the action for the entity.

17. The method of claim 16, wherein the mapping table is stored on the mobile device.

18. The method of claim 16, wherein the second mobile application is not installed on the mobile device and wherein the method further includes:

receiving a selection of the control;

downloading and installing the second mobile application on the mobile device.

19. The method of claim 16, wherein the entity matches an entity template and the entity-action pairs for the entity are identified via the entity template.

20. The method of claim 16, wherein the entity is a first entity of a plurality of entities identified in the content, and the method further includes:

selecting the first entity from among the plurality of entities based on relevance to the user.

21. The method of claim 16, wherein the entity is a first entity of a plurality of entities identified in the content, and the method further includes selecting the first entity from among the plurality of entities based on topicality to the content.

22. The method of claim 16, wherein the action is a first action and the plurality of entity-action pairs includes a second action that represents a second deep link into a third mobile application and the method further includes:

determining that the user uses the second mobile application more than the third mobile application; and selecting, in response, the first action over the second action.

* * * * *

UNITED STATES PATENT AND TRADEMARK OFFICE
CERTIFICATE OF CORRECTION

PATENT NO. : 9,703,541 B2
APPLICATION NO. : 14/724965
DATED : July 11, 2017
INVENTOR(S) : Sharifi et al.

It is certified that error appears in the above-identified patent and that said Letters Patent is hereby corrected as shown below:

On the Title Page

Column 2, Item (74), in "Attorney, Agent, or Firm", Line 1, delete "Brakes" and insert --Brake--, therefor.

In the Claims

In Column 25, Lines 65-66, Claim 1, delete "request, a plurality of entities at least" and insert --request, at least--, therefor.

In Column 28, Line 24, Claim 18, delete "control;" and insert --control; and--, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*